United States Patent
Toole et al.

(10) Patent No.: US 10,337,580 B2
(45) Date of Patent: Jul. 2, 2019

(54) ELASTOMERIC ELEMENT RETENTION

(71) Applicant: TransTech of South Carolina, Inc., Piedmont, SC (US)

(72) Inventors: Justin Ryan Toole, Travelers Rest, SC (US); William Golpe, Taylors, SC (US)

(73) Assignee: TransTech of South Carolina, Inc., Piedmont, SC (US)

( * ) Notice: Subject to any disclaimer, the term of this patent is extended or adjusted under 35 U.S.C. 154(b) by 347 days.

(21) Appl. No.: 15/262,587

(22) Filed: Sep. 12, 2016

(65) Prior Publication Data

US 2018/0073587 A1 Mar. 15, 2018

(51) Int. Cl.
*B60L 5/39* (2006.01)
*F16F 1/38* (2006.01)

(52) U.S. Cl.
CPC ............. *F16F 1/38* (2013.01); *B60L 5/39* (2013.01); *F16F 1/3856* (2013.01); *F16F 1/3863* (2013.01); *B60L 2200/26* (2013.01)

(58) Field of Classification Search
CPC .......... F16F 1/38; F16F 1/3856; F16F 1/3863; B60L 5/39
See application file for complete search history.

(56) References Cited

U.S. PATENT DOCUMENTS

| 3,799,065 A * | 3/1974 | Jackson | B60L 5/38 105/194 |
| 4,108,288 A * | 8/1978 | Manabe | B60L 5/38 191/49 |
| 5,024,283 A * | 6/1991 | Deli | B62D 33/0604 180/89.14 |
| 5,540,420 A * | 7/1996 | Luzsicza | F16C 27/063 267/141.1 |
| 6,431,530 B1 * | 8/2002 | Stamps | F16F 1/38 267/136 |
| 2018/0073587 A1 * | 3/2018 | Toole | F16F 1/38 |

* cited by examiner

*Primary Examiner* — Jason C Smith
(74) *Attorney, Agent, or Firm* — The Webb Law Firm

(57) ABSTRACT

An elastomeric element for mounting a current collection device includes an inner hub member; an outer ring defining an exterior annular surface of the elastomeric element; and an intermediate ring of elastomeric material disposed between the inner hub member and the outer ring. The outer ring includes a plurality of segments individually connected to the intermediate ring and wherein the outer ring comprises at least one locking feature configured to be engaged to prevent rotation of the elastomeric element within a housing.

20 Claims, 9 Drawing Sheets

ELASTOMERIC ELEMENT RETENTION

BACKGROUND OF THE INVENTION

Field of the Invention

The present invention relates generally to an elastomeric element for mounting a current collection device on a rail vehicle. In particular, the present invention relates to retaining an elastomeric element within a housing connected to the collection device to provide a flexible support for the current collection device on the rail vehicle.

Description of Related Art

Current collection devices for communicating electrical current/power to a rail vehicle from an electrified rail, commonly referred to as a "Third Rail", which are affixed directly to the axle bearing housings of the rail vehicle are generally known in the art. Mounting the device to axle bearing housings provides a more precise relationship to the electrified rail. As the current collection device is affixed directly to the axle bearing housings, elastomeric elements are required to provide flexibility between the mount and the current device.

In prior designs, the elastomeric element is provided within a retention housing. The elastomeric element is attached to the retention housing by providing a circular press fit between the elastomeric element and the retention housing. Movement of the rail vehicle causes the collection device to be driven to various positions with respect to the rail vehicle. As the collection device moves, the elastomeric element is loaded in multiple directions. Additionally, the collection device is subject to high vibration and shock loads. Due to this loading, previous assemblies have experienced undesired movement/pivoting of the elastomeric element relative to the retention housing. This can adversely affect the element and/or the collection device. For instance, the service life of the elastomeric element may be shortened due to the elastomeric element being moved beyond its design limits. Additionally, uncontrolled movement of the collection device could result in the collection device being moved out of place. This can cause damage to the collection device and/or elements of the rail vehicle adjacent to the collection device due to an uncontrolled collision. This represents an unacceptable level of uncertainty with respect to the operation and service life of this equipment.

SUMMARY OF THE INVENTION

Generally, provided is an elastomeric element and a retention system for an elastomeric element mounting a current collection device to a rail vehicle. The elastomeric element is retained using at least one locking and locating feature. The locking feature provides retention of the elastomeric element in all degrees of freedom. The locking feature provide a positive lock that cannot be overcome by the force induced by the elastomeric element. Preferably, the locking feature eliminates undesired motion of the elastomeric element relative to the retention housing. This undesired motion can lead to improper positioning of the element, potentially resulting in premature failure of the elastomeric element. The at least one locking feature can also function as a locating feature, which can be used to properly position the elastomeric element within the retention housing during assembly.

In one preferred and non-limiting embodiment or aspect, provided is an elastomeric element that is fitted with metallic inner and outer rings. The inner ring or hub member includes a bolt pattern for attachment to other mechanisms. The outer ring is shaped as a polygon or substantially as a polygon to provide positive position retention. The elastomeric element assembly is inserted into a matching metallic housing to set the elastomeric element in the final desired position. The outer ring is segmented. The segments are forced together to complete the outer ring. Upon forcing the segments together, the elastomer is compressed by a predetermined amount to relieve molding stresses. This process helps ensure the longest possible service life for the elastomeric element.

In other embodiments, there may be other internal and/or external features to provide the desired attachment mechanism. In any case, the retention mechanism ideally should be configured such that it is not possible for any force transferred through the elastomeric to cause the position of the elastomeric element to not be retained.

In accordance with one preferred and non-limiting embodiment or aspect of the present invention, an elastomeric element for mounting a current collection device is provided. The elastomeric element includes an inner hub member; an outer ring defining an exterior annular surface of the elastomeric element; and an intermediate ring of elastomeric material disposed between the inner hub member and the outer ring. The outer ring includes a plurality of segments individually connected to the intermediate ring and wherein the outer ring includes at least one locking feature configured to be engaged to prevent rotation of the elastomeric element within a housing.

According to the preferred and non-limiting embodiment or aspect, the inner hub member and the outer ring are formed from a metal material. The intermediate ring is bonded to the inner hub member and to each of the segments of the outer ring.

In one preferred and non-limiting embodiment or aspect, the at least one locking feature may include a flat surface defined on each of the plurality of segments of the outer ring.

In one preferred and non-limiting embodiment or aspect, the elastomeric material of the intermediate ring may be compressible such that the plurality of segments abut each other when the outer ring is engaged by the housing. The outer ring may have a substantially polygonal shape.

According to another preferred and non-limiting embodiment or aspect of the present invention, a mounting assembly for mounting a current collection device to a rail vehicle is provided. The mounting assembly includes a housing configured to be connected to the current collection device and an elastomeric element disposed within the housing. The elastomeric element includes an inner hub member; an outer ring defining an exterior annular surface of the elastomeric element; and an intermediate ring of elastomeric material disposed between the inner hub member and the outer ring. The outer ring includes a plurality of segments individually connected to the intermediate ring. The housing includes an interior surface that engages the outer ring of the elastomeric element. The interior surface of the housing and the outer ring each include at least one locking feature and the at least one locking feature of the housing engages the at least one locking feature of the outer ring to limit rotation of the elastomeric element within the housing.

According to the preferred and non-limiting embodiment or aspect, the elastomeric material of the intermediate ring is compressible and the plurality of segments of the outer ring are pressed inwardly to abut each other by the interior surface of the housing.

In one preferred and non-limiting embodiment or aspect, the at least one locking feature of the outer ring may include a flat surface defined on each of the plurality of segments of the outer ring and the at least one locking feature on the interior surface of the housing may include a plurality of corresponding flat surfaces defined in the interior surface of the housing.

According to the preferred and non-limiting embodiment or aspect, the mounting assembly further includes a mounting plate connected to the elastomeric element, the mounting plate being configured to connect to the rail vehicle. The inner hub member of the elastomeric element includes a plurality of holes configured to receive fasteners for connecting the elastomeric element to the mounting plate.

In one preferred and non-limiting embodiment or aspect, the outer ring and the interior surface of the housing may have corresponding substantially polygonal shapes.

According to the preferred and non-limiting aspect or embodiment, the inner hub member, the outer ring, and the housing are formed from a metal material. The intermediate ring is bonded to the inner hub member and to each of the segments of the outer ring.

According to another preferred and non-limiting embodiment or aspect of the present invention, a current collection device for a rail vehicle is provided. The current collection device includes an electric current collector configured to engage an electrified rail and a mounting assembly for mounting the current collection device to the rail vehicle. The mounting assembly includes a housing connected to the electric collector and an elastomeric element disposed within the housing. The elastomeric element includes an inner hub member; an outer ring defining an exterior annular surface of the elastomeric element; and an intermediate ring of elastomeric material disposed between the inner hub member and the outer ring. The outer ring includes a plurality of segments individually connected to the intermediate ring. The housing includes an interior surface that engages the outer ring of the elastomeric element. The interior surface of the housing and the outer ring each include at least one locking feature and the at least one locking feature of the housing engages the at least one locking feature of the outer ring to prevent rotation of the elastomeric element within the housing.

According to the preferred and non-limiting embodiment or aspect, the elastomeric material of the intermediate ring is compressible and the plurality of segments of the outer ring are pressed inwardly to abut each other by the interior surface of the housing.

The at least one locking feature of the outer ring includes a flat surface defined on each of the plurality of segments of the outer ring and the at least one locking feature on the interior surface of the housing includes a plurality of corresponding flat surfaces defined in the interior surface of the housing.

According to the preferred and non-limiting embodiment or aspect, the mounting assembly further includes a mounting plate connected to the elastomeric element, the mounting plate being configured to connect to the rail vehicle. The inner hub member of the elastomeric element includes a plurality of holes configured to receive fasteners for connecting the elastomeric element to the mounting plate.

In one preferred and non-limiting embodiment or aspect, the outer ring and the interior surface of the housing may have corresponding substantially polygonal shapes.

These and other features and characteristics of the present invention, as well as the methods of operation and functions of the related elements of structures, and the combination of parts and economies of manufacture will become more apparent upon consideration of the following description and with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
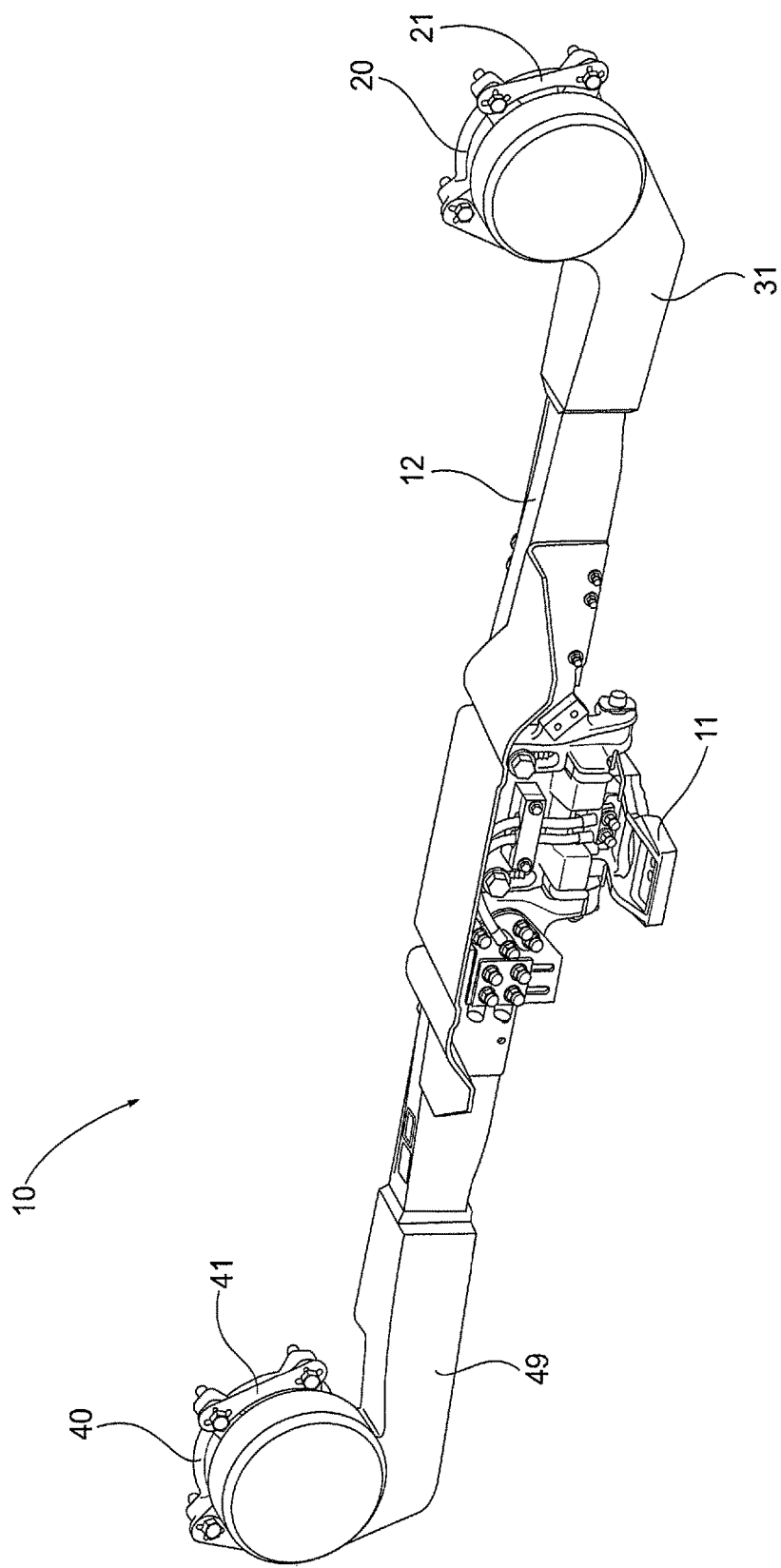
FIG. 1 is an upper perspective view of a current collection device according to the principles of the present invention.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

Figure 2:
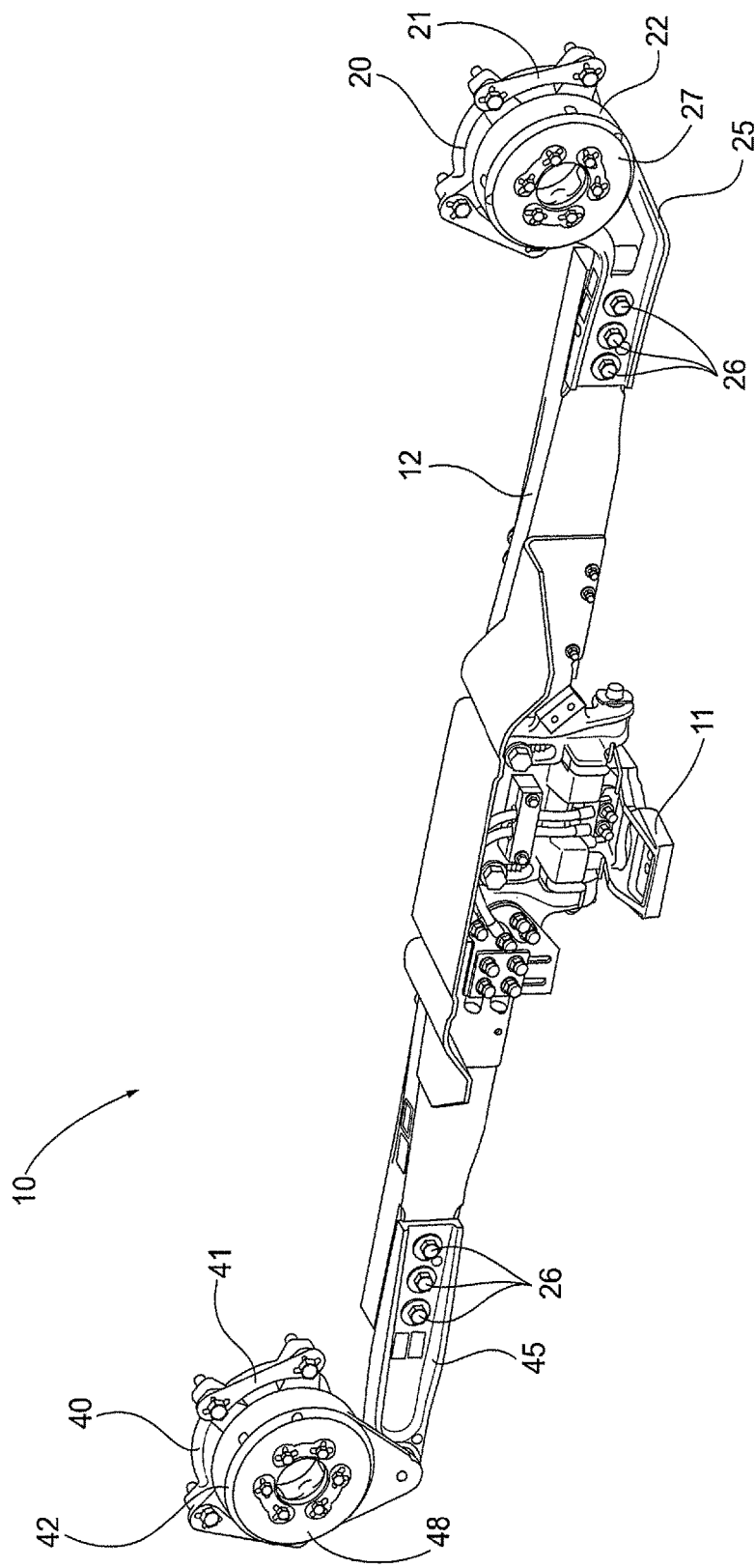
FIG. 2 is another upper perspective view of the current collection device of FIG. 1 with certain features removed for purposes of illustration.

With reference to FIGS. 1-10, a preferred and non-limiting embodiment or aspect of a current collection device 10 for a rail vehicle in accordance with the principles of the present invention is shown. As shown in FIGS. 1 and 2, the current collection device 10 includes an electric current collector or shoe 11 configured to engage an electrified rail (not shown) in order to be in electrical communication with the rail for the purpose of transmitting electric power from the electrified rail to the motor of the rail vehicle. The electric current collector 11 is disposed on a beam 12 configured to extend between adjoining axles or wheel assemblies of the rail vehicle. A first mounting assembly 20 for mounting the current collection device 10 to the rail vehicle (not shown) is connected to the right end of the beam 12. A second mounting assembly 40 is connected to the left end of the beam 12. The mounting assemblies 20, 40 may have different constructions, as will be discussed below, although both incorporate the same elastomeric element 50 and locking and locating mechanisms, as will also be discussed below. It is to be appreciated that the mounting assemblies 20, 40 may be used interchangeably on either end of the beam 12 or either of the mounting assemblies 20, 40 may be used at both ends of the beam 12.

As shown in FIGS. 1-6, the first mounting assembly 20 includes a housing 22. The housing 22 is connected to the beam 12, and therefore the electric current collector 11, by an arm 25 is integrally connected with the housing 22. The arm 25 is connected to the beam 12 by fasteners 26, such as bolts, as shown in FIG. 2, although it is to be appreciated that fasteners 26 may be of any suitable type or the arm 25 may be welded or otherwise integrally joined to the beam 12.

Figure 5:
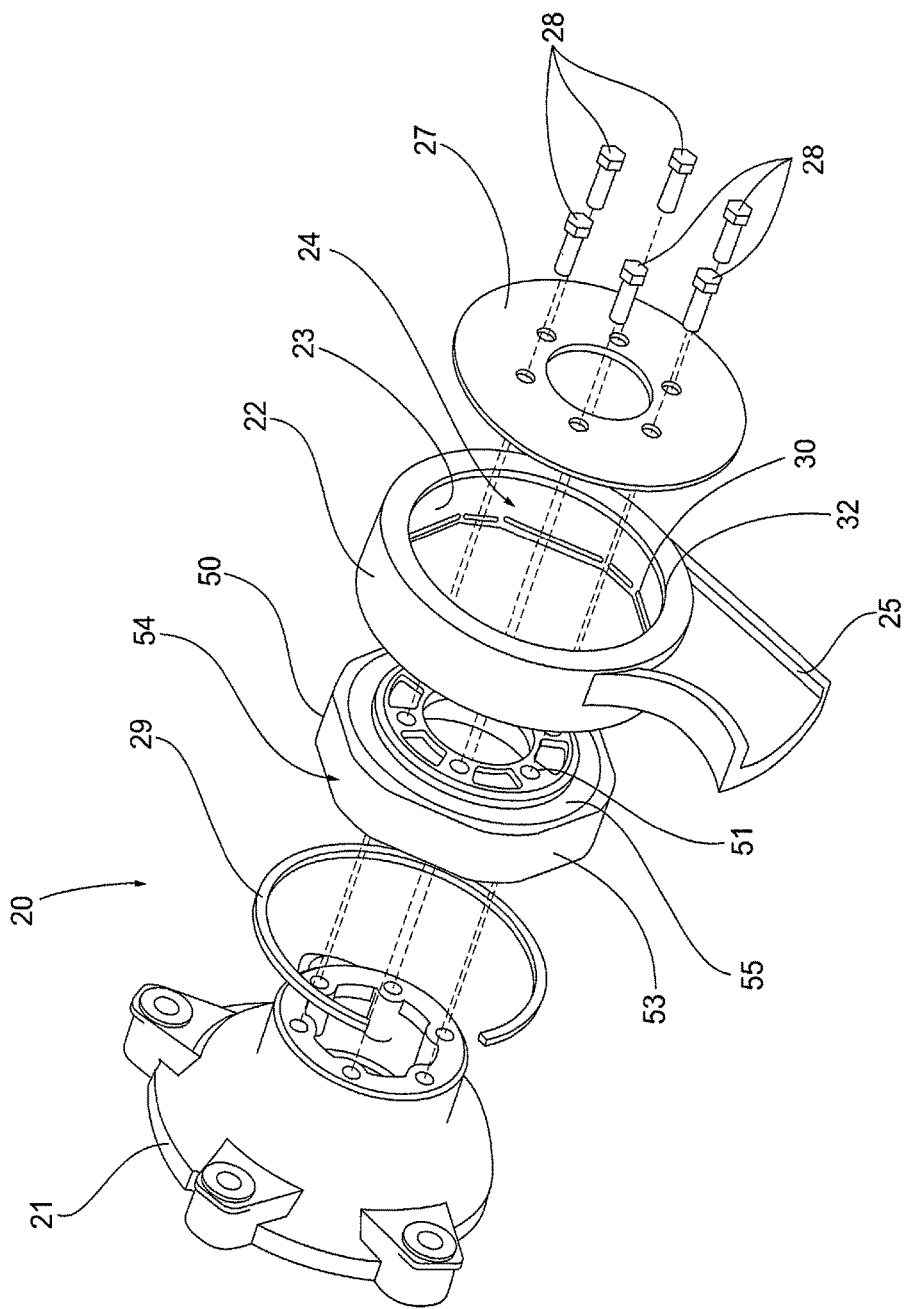
FIG. 5 is an exploded perspective view of the mounting assembly of FIG. 3.

The first mounting assembly 20 also includes an elastomeric element 50 that is disposed within the housing 22. The elastomeric element 50 includes an inner hub member 51 or ring that defines an interior annular surface 52 of the elastomeric element 50, an outer ring 53 that defines an exterior annular surface 54 of the elastomeric element 50, and an intermediate ring 55 made from an elastomeric material disposed between the inner hub member 51 and the outer ring 53. The housing 22 includes an interior surface 23 defined therein that engages the exterior annular surface 54 of the outer ring 53 when the elastomeric element 50 is disposed within the housing 22. The housing 22 includes an internal flange 32 extending inwardly from the interior surface 23 on one side of the housing 22 that serves to retain the elastomeric element 50 within the housing 22 and as a stop for assembly of the elastomeric element 50 into the housing 22. As shown in FIG. 5, the interior surface 23 of the housing 22 also includes a plurality of slots 30 defined in the interior surface 23 opposite to the internal flange 32. The slots 30 receive a washer 29 or flexible ring that can be snapped into the slots 30 after the elastomeric element 50 has been assembled into the housing 22 to maintain the position of the elastomeric element 50 within the housing 22.

Figure 3:
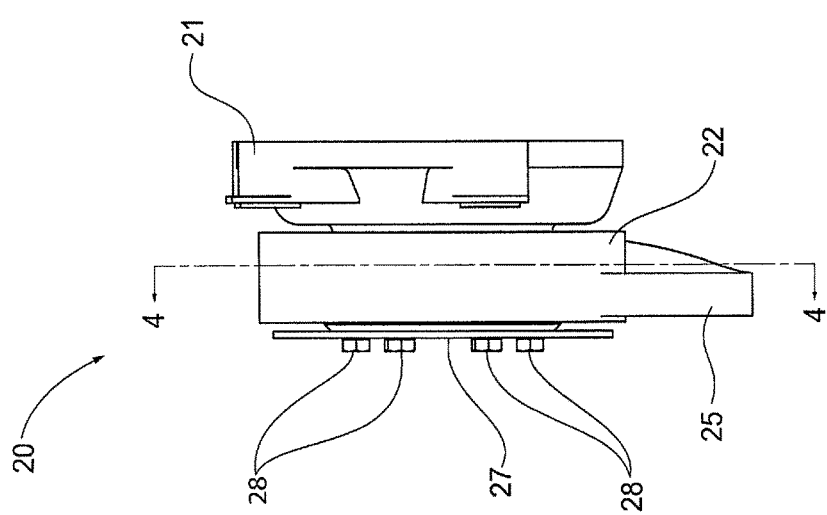
FIG. 3 is a side view of a mounting assembly of the current collection device of FIG. 1.

As shown in FIGS. 1-3 and 5, the first mounting assembly 20 further includes a mounting plate 21 connected to the elastomeric element 50. The mounting plate 21 is configured to connect to the rail vehicle, in particular to an axle bearing housing of the rail vehicle, in order to connect the current collection device 10 to the rail vehicle. The inner ring 51 of the elastomeric element 50 includes a plurality of holes 63 defined therein for receiving fasteners 28, such as bolts, that connect the elastomeric element 50 to the mounting plate 21. As shown in FIGS. 2, 3, and 5, the first mounting assembly 20 is also provided with a backing plate 27 to cover the elastomeric element 50 and the housing 22 from a side of the housing 22 opposite to the mounting plate 21. The fasteners 28 extend through the backing plate 27 and the holes 63 in the inner ring 51 of the elastomeric element 50 to connect both to the mounting plate 21. As shown in FIG. 1, the first mounting assembly 20 may also be covered with a boot 31 that protects the first mounting assembly 20 from corrosion and environmental contaminants.

Figure 8:
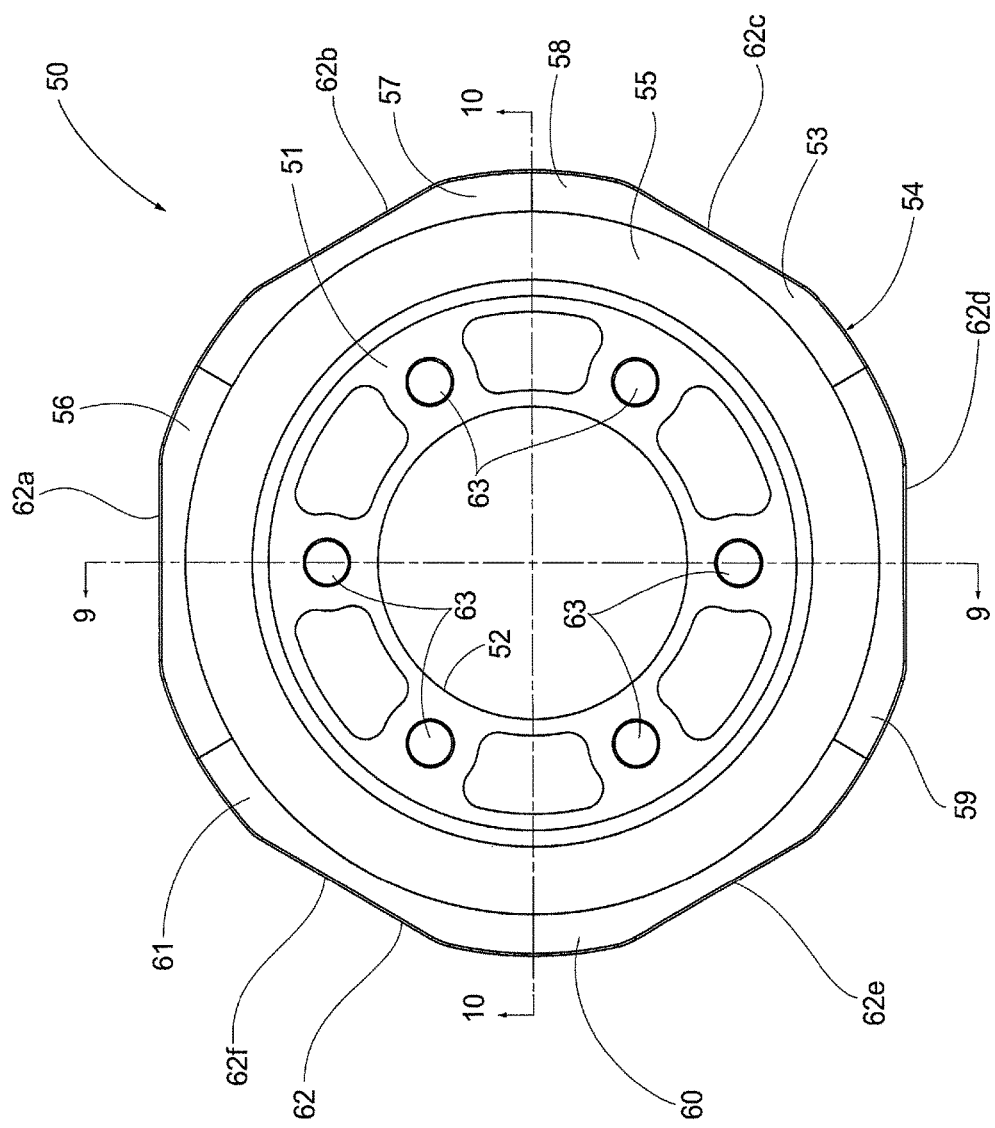
FIG. 8 is a front view of an elastomeric element of the mounting assembly of FIG. 3.
Figure 9:
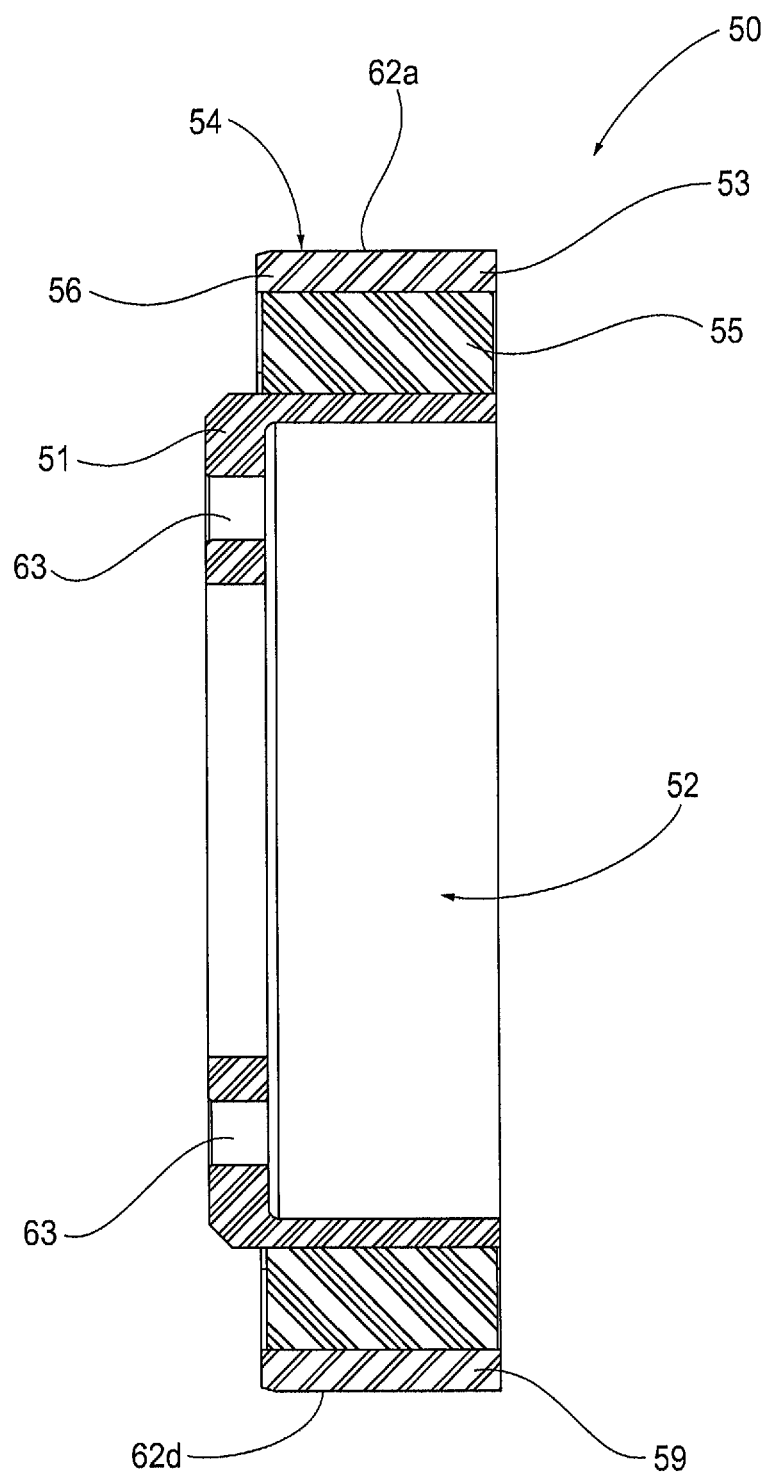
FIG. 9 is a cross-sectional view of the elastomeric element of FIG. 8 taken along lines 9-9 shown in FIG. 8.
Figure 10:
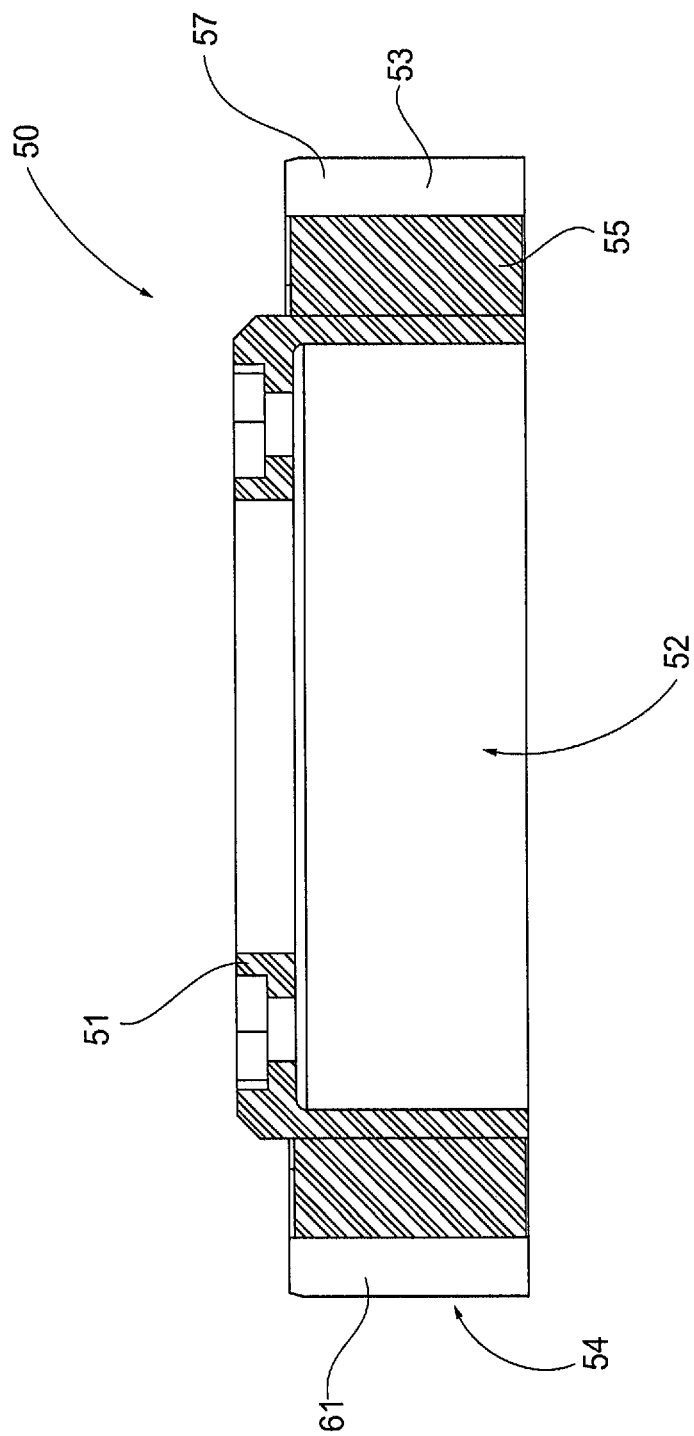
FIG. 10 is a cross-sectional view of the elastomeric element of FIG. 8 taken along lines 10-10 shown in FIG. 8.

With reference to FIGS. 8-10, the elastomeric element 50 includes the inner hub member 51, the outer ring 53, and the intermediate ring 55. According to one particular and non-limiting embodiment or aspect of the present invention, the inner hub member 51 and the outer ring 53 are formed from a metal material such as steel, stainless steel, or aluminum. The housing 22 of the first mounting assembly 20 may also be formed from the same metal material in order to avoid a galvanic reaction between the metal components and prevent corrosion. According to another particular and non-limiting embodiment or aspect of the present invention, the intermediate ring 55 is made from an elastomeric material, such as natural rubber. It is to be appreciated that the inner hub member 51, the outer ring 53, the housing 22, and the intermediate ring 55 may be formed from any material known to be suitable to those having ordinary skill in the art.

As shown in FIGS. 8-10, the outer ring 53 includes a plurality of individual segments 56, 57, 58, 59, 60, 61 that are equally sized and evenly distributed about the outside of the intermediate ring 55. Each segment 56, 57, 58, 59, 60, 61 is individually connected to the intermediate ring 55. According to one particular and non-limiting embodiment or aspect of the present invention, the intermediate ring 55 is bonded, such as through a vulcanizing process or via a chemical adhesive, to each segment 56, 57, 58, 59, 60, 61 of the outer ring 53 and the inner hub member 51. It is to be appreciated, however, that the inner hub member 51 and the segments 56, 57, 58, 59, 60, 61 of the outer ring 53 may be connected to the intermediate ring 55 using any process known to be suitable to those having ordinary skill in the art. The elastomeric material of the intermediate ring 55 is compressible and the segments 56, 57, 58, 59, 60, 61 of the outer ring 53 are arranged such that they are pressed inwardly to abut each other, as shown in FIGS. 4 and 8, by the interior surface 23 of the housing 22 when the elastomeric element 50 is disposed within the housing 22 such that the interior surface 23 of the housing 22 is in engagement with the exterior annular surface 54 of the outer ring 53.

It is to be appreciated that the compression of the intermediate ring 55 to bring the individual segments 56, 57, 58, 59, 60, 61 of the outer ring together within the housing 22 results in a more positive engagement between the outer ring 53 and the housing 22 and easier assembly. Also, the engagement between the segments 56, 57, 58, 59, 60, 61 and the interior surface 23 of the housing 22 serves to hold the intermediate ring 55 in a compressed state, which alleviates residual stresses in the intermediate ring 55 and increases the operational lifetime of the elastomeric element 50.

With reference to FIGS. 4, 6, and 8-10, the interior surface 23 of the housing 22 includes at least one locking feature 24 and the outer ring 53 includes at least one corresponding locking feature 62. When the elastomeric element 50 is disposed within the housing 22, the at least one locking feature 24 of the housing 22 engages the at least one locking feature 62 of the outer ring 53 to prevent rotation of the elastomeric element 50 within the housing 22. In particular, the at least one locking feature 62 of the outer ring 53 includes a flat surface 62a, 62b, 62c, 62d, 62e, 62f defined on each segment 56, 57, 58, 59, 60, 61 of the outer ring 53, respectively. The at least one locking feature 24 of the housing 22 includes a plurality of corresponding flat surfaces 24a, 24b, 24c, 24d, 24e, 24f defined in the interior surface 23 of the housing 22.

Figure 4:
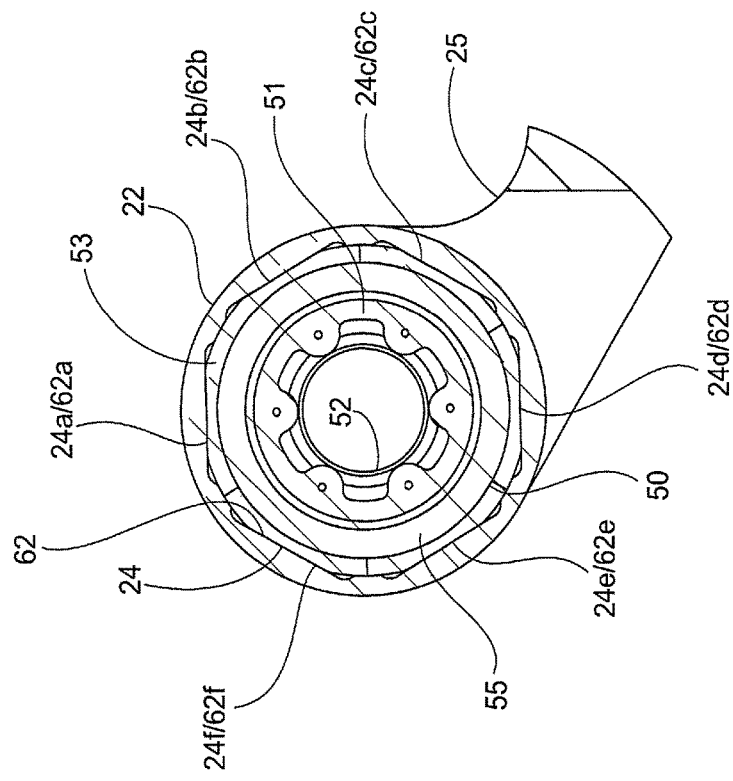
FIG. 4 is a cross-sectional view of the mounting assembly of FIG. 3 taken along lines 4-4 shown in FIG. 3.

As shown in FIG. 4, the flat surfaces 62a, 62b, 62c, 62d, 62e, 62f defined on each segment 56, 57, 58, 59, 60, 61 of the outer ring 53 are engaged by the corresponding flat surfaces 24a, 24b, 24c, 24d, 24e, 24f defined in the interior surface 23 of the housing 22 when the elastomeric element 50 is disposed within the housing 22. This engagement serves to prevent rotation of the elastomeric element 50 with respect to the housing 22 and lock the elastomeric element 50 within a desired indexed position within the housing 22. The above-described locking features 24, 62 also serve as locating features for use during assembly of the elastomeric element 50 into the housing 22, since the elastomeric element 50 may only be positioned in a particular orientation with respect to the housing 22.

Figure 6:
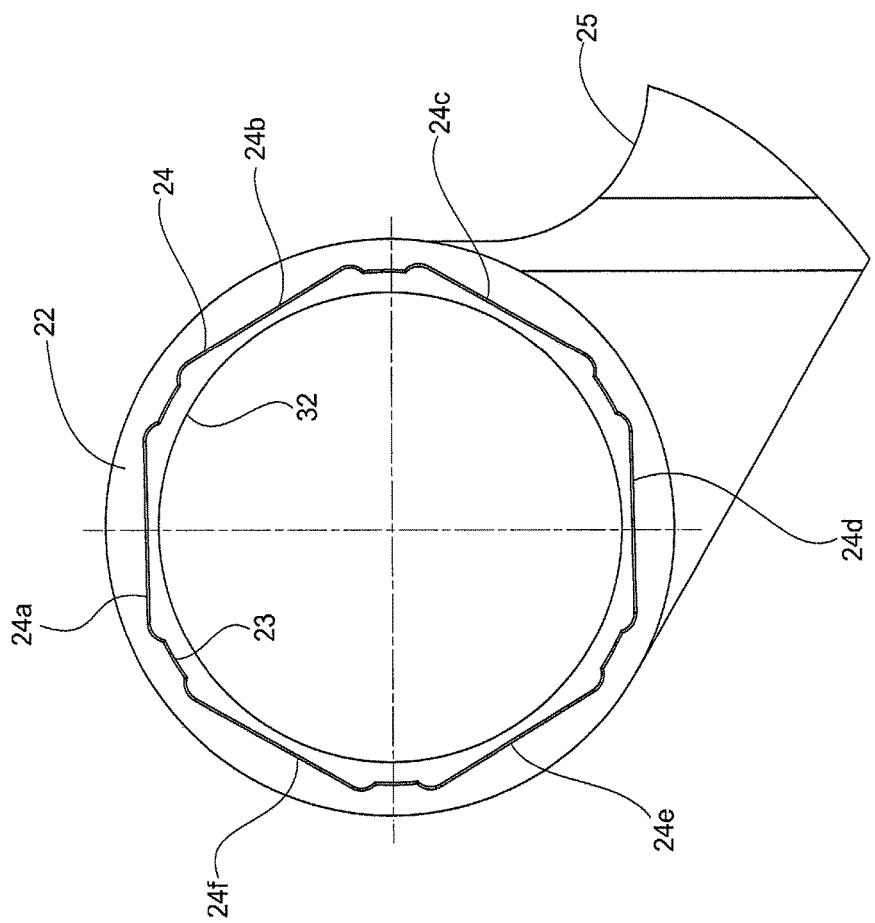
FIG. 6 is a front view of a housing of the mounting assembly of FIG. 3.

As shown, the arrangement of the flat surfaces 62a, 62b, 62c, 62d, 62e, 62f on the outer ring 53 provides the outer ring 53 with a substantially polygonal, particularly a substantially hexagonal, shape. The flat surfaces 24a, 24b, 24c, 24d, 24e, 24f provide the interior surface 23 of the housing 22 with a corresponding substantially polygonal, particularly a substantially hexagonal, shape. It is to be appreciated that the term "substantially" as used herein means that the shape of the outer ring 53 and the interior surface 23 of the housing 22 need not be precisely in the shape of a polygon, such as a hexagon, but may deviate from the precise geometric configuration of a polygon. For instance, as shown in FIGS. 4 and 8, the outer ring 53 has slightly rounded surfaces where the segments 56, 57, 58, 59, 60, 61 abut, which alternate with the flat surfaces 62a, 62b, 62c, 62d, 62e, 62f, rather than precise edges defining the corners of a polygon. Similarly, as shown in FIGS. 4 and 6, in the interior surface 23 of the housing 22, the flat surfaces 24a, 24b, 24c, 24d, 24e, 24f are alternated with shaped corners that engage the rounded surfaces of the outer ring 53 and provide recesses to facilitate for assembly of the elastomeric element 50 into the housing 22.

Figure 7:
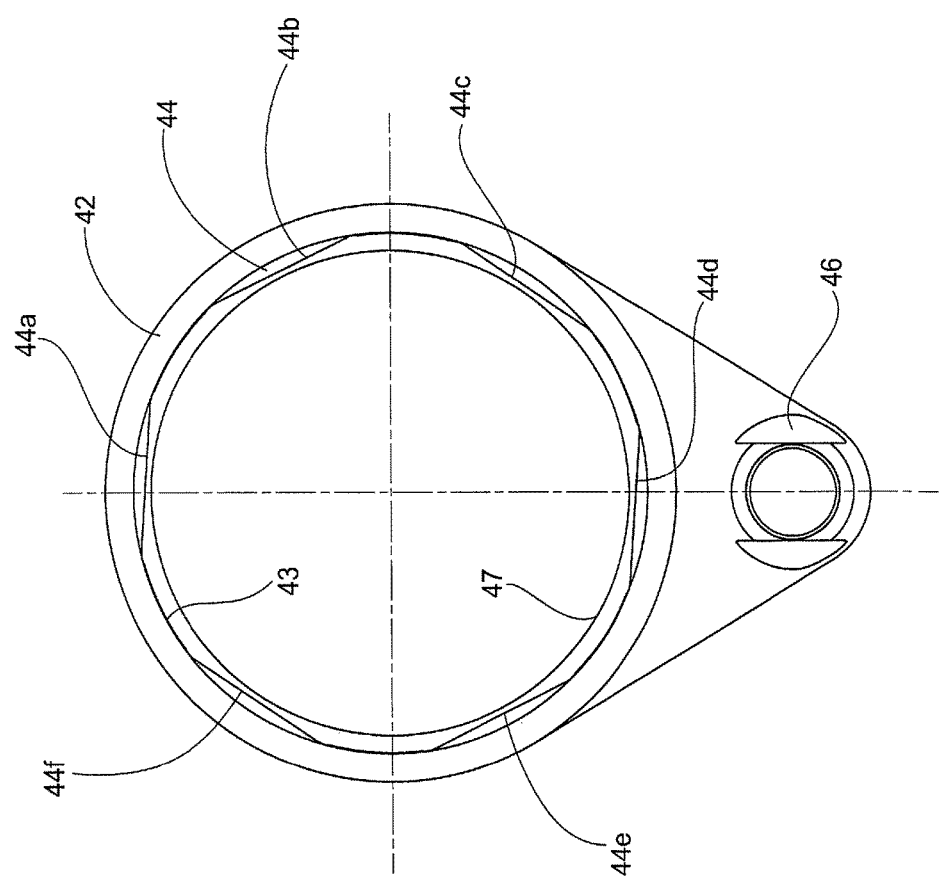
FIG. 7 is a front view of another housing of the other mounting assembly of the current collection device shown in FIG. 1.

With reference to FIGS. 1, 2, and 7, the second mounting assembly 40 is of a similar construction to the first mounting assembly 20, discussed above. The second mounting assembly includes a housing 42 that is connected to the beam 12, and therefore the electric current collector 11, by an arm 45. The housing 42 includes a protrusion 46 extending therefrom that is received in a corresponding aperture (not shown) in the arm 45 to mount the housing 42 on the arm 45. The arm 45 is connected to the beam 12 by fasteners 26, such as bolts, as shown in FIG. 2.

The second mounting assembly 40 also includes the elastomeric element 50, as discussed above. The housing 42 includes an interior surface 43 defined therein that engages the external annular surface 54 of the outer ring 53 when the elastomeric element 50 is disposed within the housing 42. The housing 42 includes an internal flange 47 extending inwardly from the interior surface 43 on one side of the housing 42 that serves to retain the elastomeric element 50 within the housing 42 and as a stop for assembly of the elastomeric element 50 into the housing 22. The interior surface 43 of the housing may also include a plurality of slots (not shown) defined in the interior surface 43 opposite to the internal flange 47, which receive a washer or flexible ring (not shown) for maintaining the position of the elastomeric element 50 within the housing 42 in a manner similar to the slots 30 and washer 29 discussed above with respect to the first mounting assembly 20.

As shown in FIGS. 1 and 2, the second mounting assembly 40 further includes a mounting plate 41 connected to the elastomeric element 50 in the same manner as the mounting plate 21 is mounted to the elastomeric element 50 in the first mounting assembly 20, as discussed above. The mounting plate 41 is configured to connect to the rail vehicle, in particular to an axle bearing housing of the rail vehicle, in order to connect the current collection device 10 to the rail vehicle. The second mounting assembly 40 is also provided with a backing plate 48 fastened to the elastomeric element 50 and the mounting plate 41 in the same manner as the backing plate 27 discussed above with reference to the first mounting assembly 20. As shown in FIG. 1, the second mounting assembly 40 may also be covered with a boot 49 that protects the second mounting assembly 40 from corrosion and environmental contaminants.

With reference to FIG. 7, the interior surface 43 of the housing 42 includes at least one locking feature 44 that corresponds to the at least one locking feature 62 of the outer ring 53. When the elastomeric element 50 is disposed within the housing 42, the at least one locking feature 44 of the housing 42 engages the at least one locking feature 62 of the outer ring 53 to prevent rotation of the elastomeric element 50 within the housing 42. In particular, the at least one locking feature 44 of the housing 42 includes a plurality of flat surfaces 44a, 44b, 44c, 44d, 44e, 44f that correspond to the flat surfaces 62a, 62b, 62c, 62d, 62e, 62f on the outer ring 53. The flat surfaces 62a, 62b, 62c, 62d, 62e, 62f of the outer ring 53 are engaged by the corresponding flat surfaces 44a, 44b, 44c, 44d, 44e, 44f defined in the interior surface 43 of the housing 42 when the elastomeric element 50 is disposed within the housing 42. This engagement serves to prevent rotation of the elastomeric element 50 with respect to the housing 42 in the same manner as discussed above with respect to the first mounting assembly 20. Also, as discussed above, the locking features 44, 62 also serve as locating features for use during assembly of the elastomeric element 50 within the housing 42. Also as shown, the flat surfaces 44a, 44b, 44c, 44d, 44e, 44f provide the interior surface 43 of the housing 42 with a substantially polygonal, particularly a substantially hexagonal, shape that corresponds to the substantially polygonal shape of the outer ring 53 of the elastomeric element 50.

With reference to FIGS. 1-10, in use the current collection device 10 is assembled with an elastomeric element 50 disposed within each housing 22, 42 of the first and second mounting assemblies 20, 40. The mounting plates 21, 41 are then connected to the rail vehicle such that the current collection device 10 is connected to the rail vehicle at two different locations on the rail vehicle. According to one particular and non-limiting embodiment or aspect, the mounting plates 21, 41 are connected directly to the axle bearing housings of two adjacent axles of the rail vehicle. The current collection device 10 is mounted to the rail vehicle such that the electric current collector 11 is positioned to engage an electrified rail extending along the length of the rail upon which the rail vehicle travels. Movements and disturbances to the current collection device 10 as the rail vehicle travels, which may be due to vibration and shock loads on the device 10, are transferred to the elastomeric elements 50 at each end of the beam 12 such that the position of the current collection device 10 with respect to the rail vehicle and the electrified rail can be maintained at all times to maintain the electric connection between the current collection device 10 and the electrified rail. The corresponding locking features 24, 44, 62 between the housings 22, 42 and the elastomeric element 50 serve to prevent rotation of the elastomeric element with respect to the housings 22, 42, in order to alleviate the buildup of stress on the intermediate ring 55 caused by permanent twisting of the elastomeric element 50 and to eliminate misalignment of the current collection device 10 with respect to the rail vehicle 10.

It is to be understood that the invention may assume various alternative variations and step sequences, except where expressly specified to the contrary. It is also to be understood that the specific devices and processes illustrated in the attached drawings, and described in the specification, are simply exemplary embodiments or aspects of the invention. Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope thereof. For example, it is to be understood that the present invention contemplates that, to the extent possible, one or more features of any embodiment or aspect can be combined with one or more features of any other embodiment or aspect.

The invention claimed is:

1. An elastomeric element for mounting a current collection device, comprising:
    an inner hub member;
    an outer ring defining an exterior annular surface of the elastomeric element; and
    an intermediate ring of elastomeric material disposed between the inner hub member and the outer ring,
    wherein the outer ring comprises a plurality of segments individually connected to the intermediate ring and wherein the outer ring comprises at least one locking feature configured to be engaged to prevent rotation of the elastomeric element within a housing.

2. The elastomeric element according to claim 1, wherein the inner hub member and the outer ring are formed from a metal material.

3. The elastomeric element according to claim 1, wherein the intermediate ring is bonded to the inner hub member and to each of the segments of the outer ring.

4. The elastomeric element according to claim 1, wherein the at least one locking feature comprises a flat surface defined on each of the plurality of segments of the outer ring.

5. The elastomeric element according to claim 1, wherein the elastomeric material of the intermediate ring is compressible such that the plurality of segments abut each other when the outer ring is engaged by the housing.

6. The elastomeric element according to claim 1, wherein the outer ring has a substantially polygonal shape.

7. A mounting assembly for mounting a current collection device to a rail vehicle, comprising:
    a housing configured to be connected to the current collection device; and
    an elastomeric element disposed within the housing, the elastomeric element comprising:
    an inner hub member;
    an outer ring defining an exterior annular surface of the elastomeric element; and
    an intermediate ring of elastomeric material disposed between the inner hub member and the outer ring,
    wherein the outer ring comprises a plurality of segments individually connected to the intermediate ring,
    wherein the housing comprises an interior surface that engages the outer ring of the elastomeric element, and
    wherein the interior surface of the housing and the outer ring each comprise at least one locking feature and the at least one locking feature of the housing engages the at least one locking feature of the outer ring to limit rotation of the elastomeric element within the housing.

8. The mounting assembly according to claim 7, wherein the elastomeric material of the intermediate ring is compressible and the plurality of segments of the outer ring are pressed inwardly to abut each other by the interior surface of the housing.

9. The mounting assembly according to claim 7, wherein the at least one locking feature of the outer ring comprises a flat surface defined on each of the plurality of segments of the outer ring and the at least one locking feature on the interior surface of the housing comprises a plurality of corresponding flat surfaces defined in the interior surface of the housing.

10. The mounting assembly according to claim 7, further comprising a mounting plate connected to the elastomeric element, the mounting plate being configured to connect to the rail vehicle.

11. The mounting assembly according to claim 10, wherein the inner hub member of the elastomeric element comprises a plurality of holes configured to receive fasteners for connecting the elastomeric element to the mounting plate.

12. The mounting assembly according to claim 7, wherein the outer ring and the interior surface of the housing have corresponding substantially polygonal shapes.

13. The mounting assembly according to claim 7, wherein the inner hub member, the outer ring, and the housing are formed from a metal material.

14. The mounting assembly according to claim 7, wherein the intermediate ring is bonded to the inner hub member and to each of the segments of the outer ring.

15. A current collection device for a rail vehicle, comprising:
    an electric current collector configured to engage an electrified rail; and
    a mounting assembly for mounting the current collection device to the rail vehicle, the mounting assembly comprising:
    a housing connected to the electric current collector; and
    an elastomeric element disposed within the housing, the elastomeric element comprising:
    an inner hub member;
    an outer ring defining an exterior annular surface of the elastomeric element; and
    an intermediate ring of elastomeric material disposed between the inner hub member and the outer ring,
    wherein the outer ring comprises a plurality of segments individually connected to the intermediate ring,
    wherein the housing comprises an interior surface that engages the outer ring of the elastomeric element, and
    wherein the interior surface of the housing and the outer ring each comprise at least one locking feature and the at least one locking feature of the housing engages the at least one locking feature of the outer ring to prevent rotation of the elastomeric element within the housing.

16. The current collection device according to claim 15, wherein the elastomeric material of the intermediate ring is compressible and the plurality of segments of the outer ring are pressed inwardly to abut each other by the interior surface of the housing.

17. The current collection device according to claim 15, wherein the at least one locking feature of the outer ring comprises a flat surface defined on each of the plurality of segments of the outer ring and the at least one locking feature on the interior surface of the housing comprises a plurality of corresponding flat surfaces defined in the interior surface of the housing.

18. The current collection device according to claim 15, wherein the mounting assembly further comprises a mounting plate connected to the elastomeric element, the mounting plate being configured to connect to the rail vehicle.

19. The current collection device according to claim 18, wherein the inner hub member of the elastomeric element comprises a plurality of holes configured to receive fasteners for connecting the elastomeric element to the mounting plate.

20. The current collection device according to claim 15, wherein the outer ring and the interior surface of the housing have corresponding substantially polygonal shapes.

* * * * *